United States Patent
Lee

(10) Patent No.: US 9,697,941 B2
(45) Date of Patent: Jul. 4, 2017

(54) DISPLAY DEVICE

(71) Applicant: SAMSUNG DISPLAY CO., LTD., Yongin-si, Gyeonggi-do (KR)

(72) Inventor: Ki-seob Lee, Seongnam-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 14/985,297

(22) Filed: Dec. 30, 2015

(65) Prior Publication Data

US 2016/0278222 A1  Sep. 22, 2016

(30) Foreign Application Priority Data

Mar. 17, 2015 (KR) .......................... 10-2015-0036974

(51) Int. Cl.
*H01F 7/20* (2006.01)
*G02F 1/13* (2006.01)

(52) U.S. Cl.
CPC  *H01F 7/20* (2013.01); *G02F 1/13* (2013.01)

(58) Field of Classification Search
CPC combination set(s) only.
See application file for complete search history.

(56) References Cited

U.S. PATENT DOCUMENTS

| | | | |
|---|---|---|---|
| 5,648,762 A * | 7/1997 | Ichimura | G06F 1/1632 361/679.4 |
| 6,788,292 B1 * | 9/2004 | Nako | G06F 1/1616 345/173 |
| 6,972,752 B2 * | 12/2005 | Nako | G06F 1/1616 345/173 |
| 8,654,519 B2 * | 2/2014 | Visser | G09F 9/00 361/679.21 |
| 8,787,016 B2 * | 7/2014 | Rothkopf | H04M 1/0216 361/679.02 |
| 8,804,324 B2 * | 8/2014 | Bohn | G06F 1/1616 345/1.1 |
| 8,804,349 B2 * | 8/2014 | Lee | G06F 1/1641 361/679.01 |
| 9,013,864 B2 * | 4/2015 | Griffin | H04M 1/0216 16/382 |
| 9,460,643 B2 * | 10/2016 | Hirakata | G09F 9/301 |

(Continued)

FOREIGN PATENT DOCUMENTS

| JP | 3262286 B2 | 3/2002 |
|---|---|---|
| JP | 2013-011893 A | 1/2013 |

(Continued)

OTHER PUBLICATIONS

Abstract for Japanese Publication No. JPH05183920 A, dated Jul. 23, 1993, for corresponding JP 3262286 B2, 2 pages.

*Primary Examiner* — Lisa Lea Edmonds
(74) *Attorney, Agent, or Firm* — Lewis Roca Rothgerber Christie LLP

(57) ABSTRACT

A display device includes a display panel, an accommodation member configured to accommodate the display panel therein and to fold or unfolded the display panel along one direction, and a magnetic force generating member coupled to the accommodation member, the magnetic force generating member being configured to magnetized when current flows, and to generate a magnetic force in a first state in which the display panel is unfolded.

16 Claims, 14 Drawing Sheets

(56) References Cited

U.S. PATENT DOCUMENTS

| | | | | |
|---|---|---|---|---|
| 2012/0307423 A1* | 12/2012 | Bohn | G06F 1/1641 | 361/679.01 |
| 2013/0120912 A1* | 5/2013 | Ladouceur | H04M 1/0268 | 361/679.01 |
| 2014/0029190 A1* | 1/2014 | Sato | G06F 1/1641 | 361/679.27 |
| 2014/0226275 A1* | 8/2014 | Ko | G06F 1/1626 | 361/679.27 |
| 2015/0116921 A1* | 4/2015 | Hsu | G06F 1/1624 | 361/679.27 |
| 2015/0146349 A1* | 5/2015 | Choi | G06F 1/1677 | 361/679.01 |
| 2015/0146385 A1 | 5/2015 | Kim | | |
| 2015/0241925 A1* | 8/2015 | Seo | G06F 1/1652 | 361/679.27 |
| 2015/0261259 A1* | 9/2015 | Endo | G06F 1/1652 | 361/679.06 |
| 2015/0366089 A1* | 12/2015 | Park | G06F 1/1652 | 361/679.01 |
| 2015/0370287 A1* | 12/2015 | Ko | G06F 1/1626 | 361/749 |
| 2015/0378397 A1* | 12/2015 | Park | G06F 1/1652 | 361/679.27 |
| 2016/0085271 A1* | 3/2016 | Morrison | G06F 1/1681 | 361/679.27 |
| 2016/0116944 A1* | 4/2016 | Lee | H04M 1/022 | 361/679.26 |

FOREIGN PATENT DOCUMENTS

| | | |
|---|---|---|
| KR | 10-2007-0066650 A | 6/2007 |
| KR | 10-2010-0091857 A | 8/2010 |
| KR | 10-2012-0034506 A | 4/2012 |
| KR | 20-2013-0006041 U | 10/2013 |
| KR | 10-1452869 B1 | 10/2014 |
| KR | 10-2015-0047356 A | 5/2015 |
| KR | 10-2015-0059960 A | 6/2015 |

* cited by examiner

DISPLAY DEVICE

CROSS-REFERENCE TO RELATED APPLICATION

This patent application claims priority to and the benefit of Korean Patent Application No. 10-2015-0036974, filed on Mar. 17, 2015, the entire content of which is hereby incorporated by reference.

BACKGROUND

The present disclosure herein relates to a display device capable of being folded.

Display devices provide information to users by displaying various images on display surfaces. Currently, flexible display modules having bendable and flexible display panels are being developed. The flexible displays may be folded, rolled, or bent, unlike flat plate displays. Because the flexible display capable of being variously changed in shape is portable regardless of the existing size of a screen, user convenience may be improved.

SUMMARY

Aspects of the present disclosure are directed to a display device having a flat display surface in an unfolded state thereof.

According to embodiments of the inventive concept, there is provided a display device including: a display panel; an accommodation member configured to accommodate the display panel therein and to fold or unfolded the display panel along one direction; and a magnetic force generating member coupled to the accommodation member, the magnetic force generating member being configured to magnetized when current flows, and to generate a magnetic force in a first state in which the display panel is unfolded.

In an embodiment, the magnetic force is a repulsive force that pushes the display panel out.

In an embodiment, at least one portion of the display panel is supported by the magnetic force.

In an embodiment, the display panel is divided into a first area overlapping a folding axis and a second area and a third area spaced from each other with the first area therebetween in the first state, the first area is configured to change in shape in a second state in which the display panel is folded, and the first area is defined, on the same plane as those of the second and third areas, by the magnetic force in the first state.

In an embodiment, the display panel is substantially flat in the first state along a direction crossing a direction in which the folding axis extends.

In an embodiment, the magnetic force generating member overlaps at least the first area.

In an embodiment, when the display panel is unfolded, the current is applied to the magnetic force generating member, and when the display panel is folded, the current is cut off.

In an embodiment, the magnetic force generating member includes at least one electromagnet.

In an embodiment, the display panel includes: a base layer; a pixel layer on a front surface of the base layer, the pixel layer being configured to generate an image; and a magnetic layer disposed on a rear surface of the base layer, the magnetic layer exhibiting magnetism, wherein the magnetic layer overlaps at least the first area of the first to third areas.

In an embodiment, the magnetic layer includes a magnetic rubber.

In an embodiment, the magnetic force generating member is divided into a first portion adjacent to the display panel and a second portion connecting to the first portion and farther from the display panel relative to the first portion, the first portion having a different polarity from the second portion, and the magnetic layer has the same polarity as the first portion.

In an embodiment, the accommodation member includes: a first body part overlapping the second area; a second body part overlapping the third area; and a connection part overlapping the first area, and coupled to the first and second body parts.

In an embodiment, the magnetic force generating member is coupled to the connection part.

In an embodiment, the magnetic force generating member includes a plurality of magnetic force generating members, and the plurality of magnetic force generating members are on an area overlapping the first area and corresponding to the first body part, and on an area overlapping the first area and corresponding to the second body part.

In an embodiment, a minimum distance between the display panel and the magnetic force generating member in the first state is greater than that between the display panel and the magnetic force generating member in the second state.

In some embodiments, the minimum distance between the display panel and the magnetic force generating member in the state in which the display is unfolded may be greater than that between the display panel and the magnetic force generating member in a state in which the display panel is folded.

BRIEF DESCRIPTION OF THE DRAWINGS

The accompanying drawings are included to provide a further understanding of the present inventive concept, and are incorporated in, and constitute a part of, this specification. The drawings illustrate exemplary embodiments of the present inventive concept and, together with the description, serve to explain principles of the inventive concept. In the drawings.

DETAILED DESCRIPTION

Figure 1:
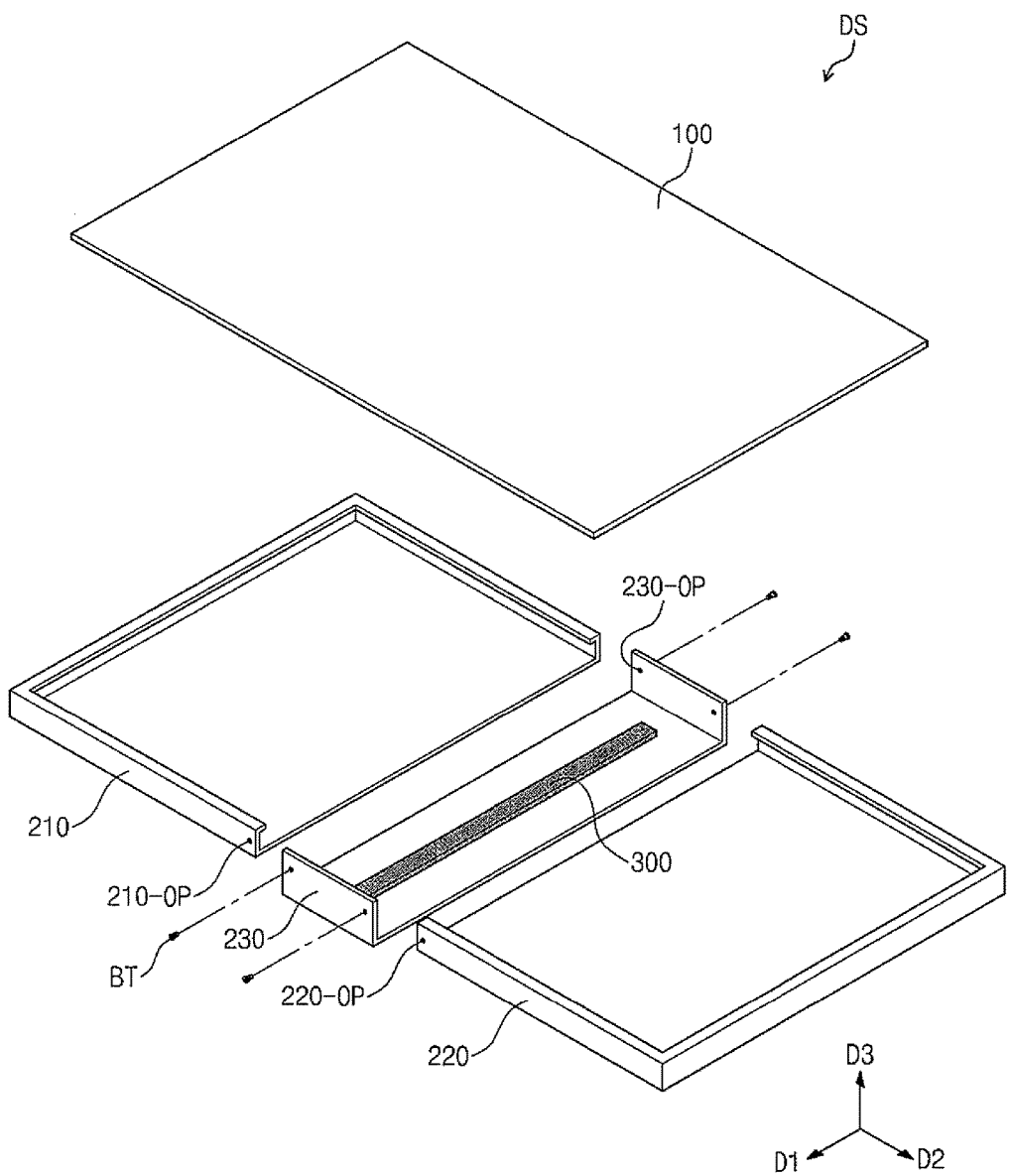
FIG. 1 is an exploded perspective view of a display device according to an embodiment of the present inventive concept.

Because the present disclosure may have diverse modified embodiments, exemplary embodiments are illustrated in the drawings and are described in the detailed description of the present inventive concept. However, this does not limit the present disclosure within specific embodiments and it should be understood that the present disclosure covers all suitable modifications, equivalents, and replacements within the idea and technical scope of the present inventive concept.

Hereinafter, embodiments of the present inventive concept will be described in detail with reference to the accompanying drawings.

Figure 2A:
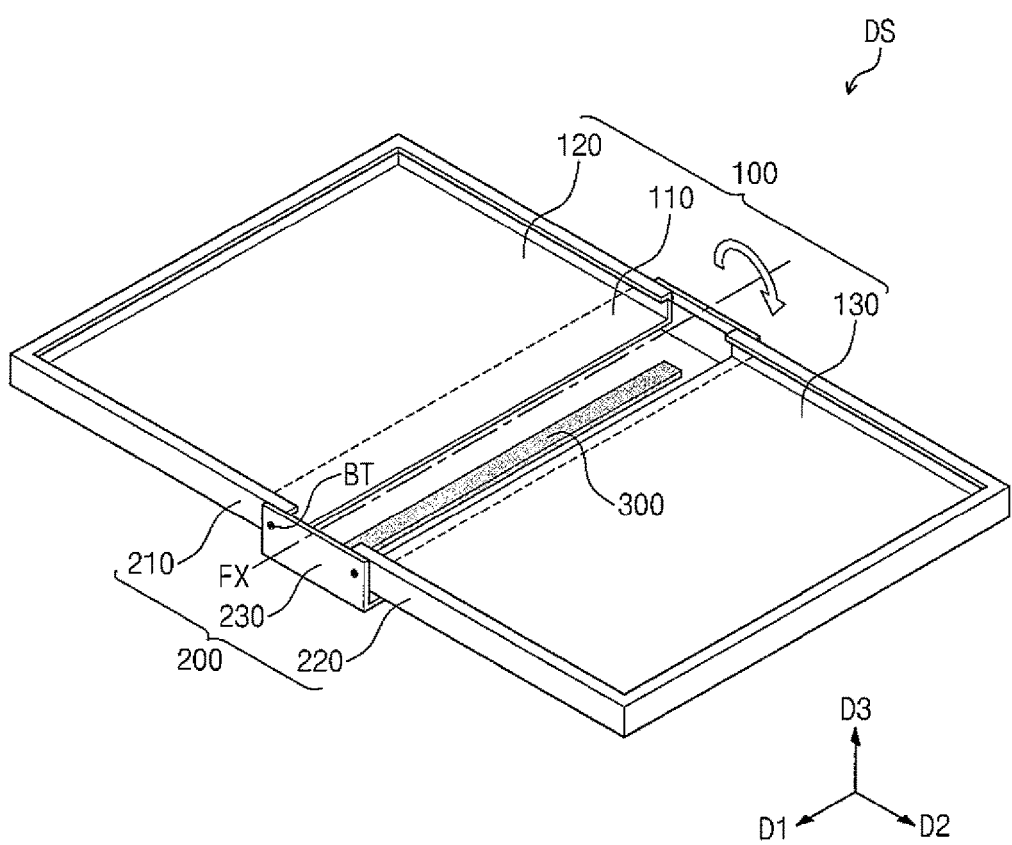
FIG. 2A is a first perspective view of the display device.
Figure 2B:
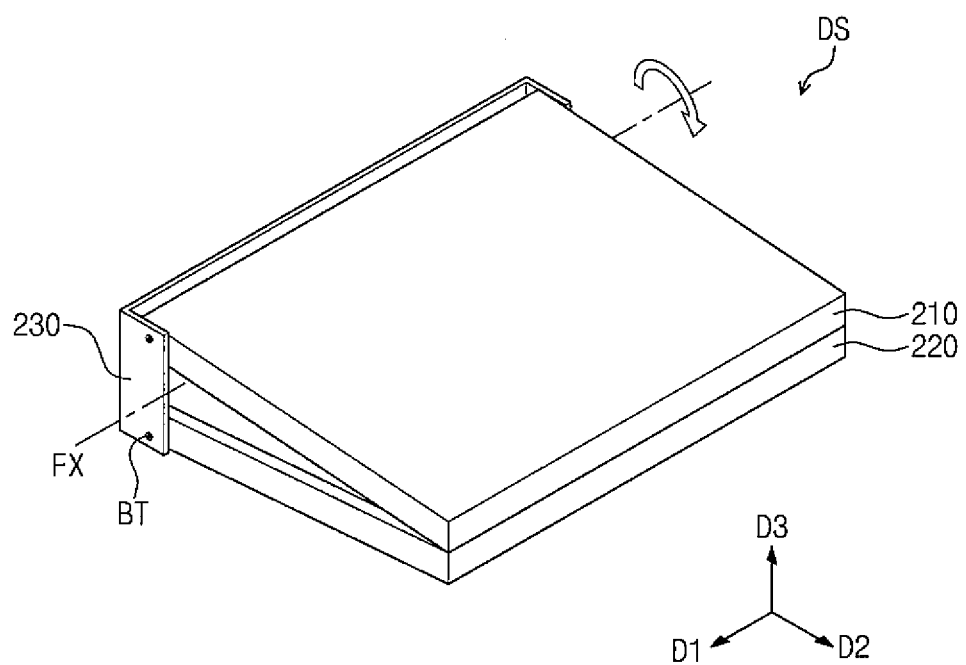
FIG. 2B is a second perspective view of the display device.

FIG. 1 is an exploded perspective view of a display device according to an embodiment of the present inventive concept. FIG. 2A is a first perspective view of the display device, and FIG. 2B is a second perspective view of the display device. The first perspective view illustrates the display device DS in a folded state, and the second perspective view illustrates the display device DS in an unfolded state. Hereinafter, the display device DS according to the present inventive concept will be described with reference to FIGS. 1 to 2B.

The display device DS may be folded or unfolded (e.g., opened) along a folding axis FX defined in a first direction D1. The display device DS includes a display panel 100, an accommodation member 200, and a magnetic force generating member 300.

The display panel 100 may display an image according to an electrical signal. The display panel 100 may include various embodiments. For example, the display panel 100 may be a liquid crystal display (LCD) panel, an organic light emitting display (OLED) panel, an electrophoretic display panel, or an electrowetting display panel.

In the current embodiment, a flexible display panel that is flexible and easily formed in a thin shape may be selected as the display panel 100. The display panel 100 may be bent or rolled to entirely form a curved surface. For example, as illustrated in FIGS. 2A and 2B, the display panel 100 may be folded or unfolded. In FIG. 2A, the display panel 100 is described as a transparent panel for convenience of explanation.

The display panel 100 may be divided into a first area 110, a second area 120, and a third area 130. The first area 110 is defined between the second area 120 and the third area 130 on a plane. The first area 110 overlaps (and corresponds in location to) the folding axis FX.

The first area 110 corresponds to an area, which is folded or unfolded as the display device DS is folded or unfolded, of the display panel 100. As the first area 110 changes in shape, the display panel 100 may be folded.

The second and third areas 120 and 130 are spaced apart from each other along a second direction D2. Each of the second and third areas 120 and 130 corresponds to an area that does not separately change in shape even though the display device DS is folded. Thus, each of the second and third areas 120 and 130 may be maintained in plane shape (e.g., flat shape) even though the display device DS is folded.

However, as the display device DS is folded, at least one of the second and third areas 120 and 130 may change in position. For example, as the display device DS is folded, the second area 120 may be disposed at an upper side D3 (hereinafter, referred to as a third direction) of the third area 130.

The first area 110 may be provided in plurality. When a plurality of folding axis is defined in the display device, the display panel may include a plurality of first areas so that areas corresponding to the folding axis are folded.

The accommodation member 200 accommodates the display panel 100. The accommodation member 200 may be folded or unfolded along the folding axis FX. As the accommodation member 200 is folded or unfolded, the display panel 100 may be folded or unfolded as well. The display device DS according to the present inventive concept may have a shape that is substantially defined according to an operation of the accommodation member 200.

The accommodation member 200 may include a first body part 210, a second body part 220, and a connection part 230. The first body part 210 overlaps the second area 120, and the second body part 220 overlaps the third area 130.

Each of the first and second body parts 210 and 220 may be divided into a plurality of portions. For example, the first body part 210 may be divided into a plane portion 211, a side surface portion 212, and a cover portion 213.

The plane portion 211 overlaps the second area 120 of the display panel 100. The plane portion 211 may have an area that is equal to or greater than that of the second area 120.

The side surface portion 212 corresponds to a portion curved from the plane portion 211 in the third direction D3. The side surface portion 212 is connected to three edges, which are connected to each other, of four edges defining an edge of the plane portion 211. Thus, the first body part 210 may have a shape having one opened edge.

The cover portion 213 corresponds to a portion that is curved from the side surface portion 212 in the first direction D1 or the second direction D2. The cover portion 213 is parallel with the plane portion 211. The cover portion 213 may cover at least one portion of the display panel 100 and prevent the display panel 100 from being separated from the outside of the accommodation member 200.

The plane portion 211, the side surface portion 212, and the cover portion 213 define a set or predetermined space. Similarly, the second body part 220 may be divided into a plane portion 211, a side surface portion 222, and a cover portion 223 defining a set or predetermined space. Because descriptions of the second body part 220 correspond to those of the first body part 210, repeated descriptions may not be provided.

The connection part 230 is coupled to each of the first and second body parts 210 and 220. The connection part 230 may be coupled to the first and second body parts 210 and 220 through coupling holes (e.g., coupling openings) 210-OP and 220-OP that are respectively defined in the side surface portion 212 of the first body part 210 and the side surface portion 222 of the second body part 220.

The connection part 230 may stably connect the first body part 210 to the second body part 220. At the same time, the connection part 230 may support the first and second body parts 210 and 220 so that the first and second body parts 210 and 220 may operate by respectively using the coupling holes 210-OP and 220-OP as axes. Thus, coupling holes (or coupling openings) 230-OP of the connection part 230, the coupling holes 210-OP and 220-OP of the first and second body parts 210 and 220, and a coupling member BP connecting therebetween may be coupled to each other so that the first and second body parts 210 and 220 are rotatable with respect to the coupling holes 210-OP and 220-OP, respectively.

The first and second body parts 210 and 220 are coupled to each other to define a predetermined inner space. The display panel 100 may be stably accommodated to the inner space of the accommodation member 200. As the first and second body parts 210 and 220 operate with respect to the connection part 230, the display panel 100 accommodated to the inner space is folded or unfolded.

The magnetic force generating member 300 is disposed in the accommodation member 200. The magnetic force generating member 300 may be disposed on an area that overlaps the first area 110 of the display panel 100.

For example, the magnetic force generating member 300 may be coupled to the connection part 230. However, the position of the magnetic force generating member 300 is exemplarily illustrated. The magnetic force generating member 300 may be disposed on various suitable areas according to the shape of the accommodation member 200 as long as the area overlaps the first area 110 and may not be limited to one embodiment.

The magnetic force generating member 300 supports the display panel 100 when the display device DS is unfolded. Because the display device DS according to an embodiment of the present inventive concept further includes the magnetic force generating member 300, a flat display surface may be provided to a user. A more detailed description of the magnetic force generating member 300 will be provided later.

Figure 3A:
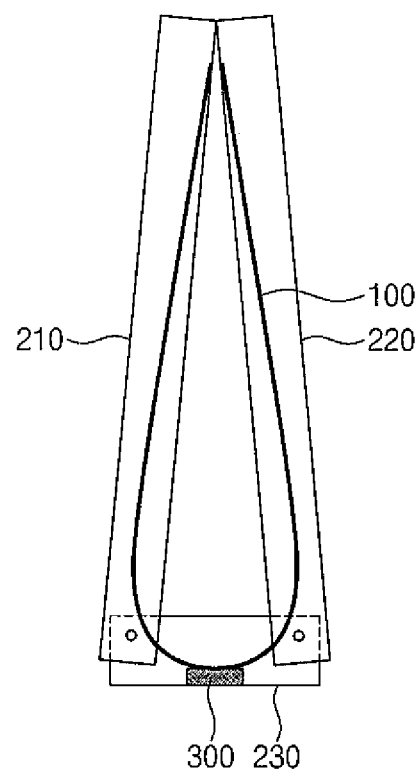
FIGS. 3A to 3C are side views illustrating the display device of FIG. 1.
Figure 3B:
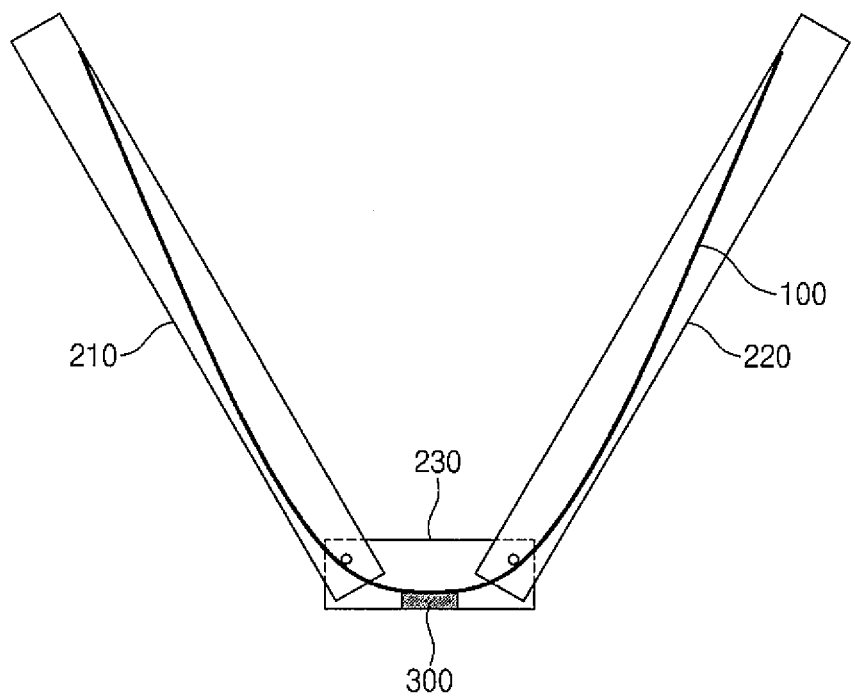
Figure 3C:
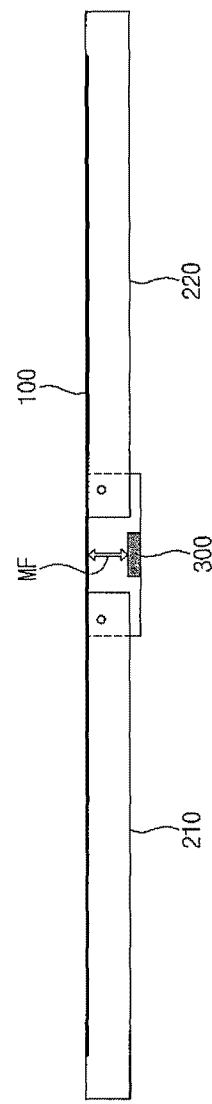

FIGS. 3A to 3C are side views illustrating the display device of FIG. 1. FIGS. 3A to 3C are cross-sectional views of the display device DS according to its operation. For convenience of description, a portion on which the first body part 210 contacts the second body part 220 of the connection part 230 is illustrated with a dotted line. Components that are the same as those of FIGS. 1 to 2B will be represented by the same reference numerals, and detailed descriptions thereof may not be provided.

As illustrated in FIGS. 3A to 3B, the display panel 100 may be flexibly accommodated to the accommodation member 200. At least one end of the second area (see reference numeral 120 of FIG. 2A) and/or one end of the third area (see reference numeral 130 of FIG. 2A) may be coupled to the accommodation member 200. Here, the first area 110 may not be coupled to the accommodation member 200.

Thus, the first area 110 may flexibly move within the inner space of the accommodation member 200. The display panel 100 changes a shape of the first area 110, and the accommodation member 200 provides a space so that the display panel 100 can change in shape, and thus, stress applied to the first area 110 may be relieved (e.g., reduced). Thus, as the display device DS is folded or unfolded, the stress applied to the first area 110 of the display panel 100 may be relieved.

As illustrated in FIG. 3A, when the display device DS is folded, the display panel 100 is accommodated to the inner space of the accommodation member 200 in a folded state. Here, the magnetic force generating member 300 is maintained in a turned-off state. Thus, because there is no specific interaction between the display panel 100 and the magnetic force generating member 300, the display panel 100 and the magnetic force generating member 300 may contact each other or be separated from each other.

As illustrated in FIG. 3B, when the display device DS starts to open, the display panel 100 is also slowly unfolded. In the current embodiment, because the one end of the second area 120 and the one end of the third area 130 are coupled to the accommodation member 200, and first area 110 is not coupled to the accommodation member 200, the display panel 100 may have a shape in which the first area 110 droops downward (e.g., is curved downward).

As illustrated in FIG. 3C, when the display device DS is completely unfolded, the magnetic force generating member 300 is turned on. The magnetic force generating member 300 has magnetized characteristics when electricity flows therethrough.

The magnetic force generating member 300 may be turned on to generate a magnetic force MF. The magnetic force MF represents a force applied between two magnetic poles. In the current embodiment, the magnetic force MF represents a repulsive force.

The magnetic force generating member 300 supports the display panel 100 in a state in which the display device DS is unfolded by using the magnetic force MF. Because the magnetic force generating member 300 uses the magnetic force MF, the magnetic force generating member 300 may support the display panel 100 even though the magnetic force generating member 300 is not physically coupled to the display panel 100. Also, the magnetic force generating member 300 may support the display panel 100 in a state in which the magnetic force generating member 300 is spaced apart from the display panel 100.

Because the display device DS according to an embodiment of the present inventive concept flexibly accommodates the display panel 100, the display device DS may relieve the stress applied to the display panel 100 according to the folding or unfolding operation. Thus, deformation or deterioration of the display panel 100 may be prevented.

Also, because the display device DS includes the magnetic force generating member 300, the display device DS may stably support the display panel 100 even though the display device DS is not coupled to the display panel 100. Because the magnetic force generating member 300 is selectively driven only in a state in which the display panel 100 is unfolded, the magnetic force generating part 300 has a relatively less effect on the display panel 100 in a state in which the display panel 100 is folded. Thus, the display panel DS may stably accommodate the display panel 100 in a folded state and provide a uniform display surface to the user in an unfolded state.

Figure 4:
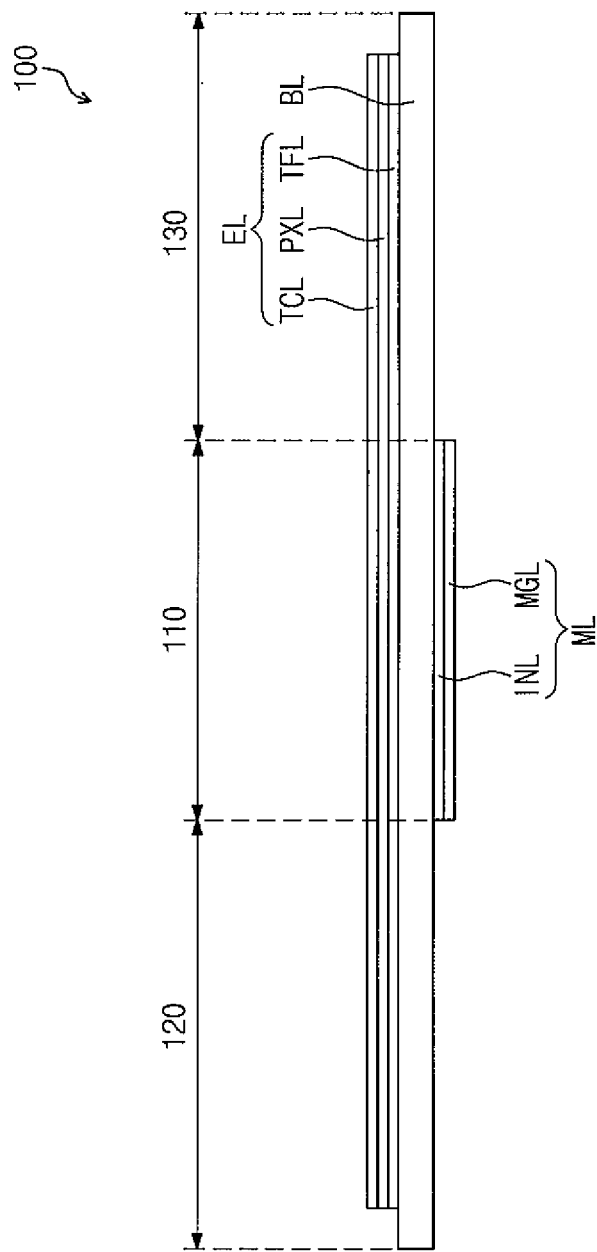
FIG. 4 is a cross-sectional view of the display panel according to an embodiment of the present inventive concept.
Figure 5:
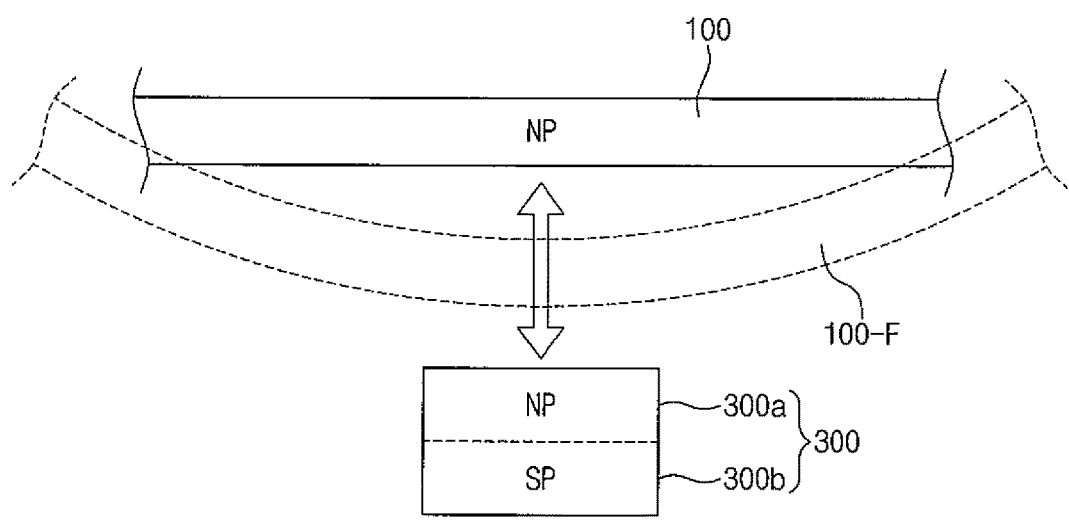
FIG. 5 is a view illustrating a portion of components of the display device.

FIG. 4 is a cross-sectional view of the display panel according to an embodiment of the present inventive concept. FIG. 5 is a view illustrating a portion of the components of the display device. FIG. 5 illustrates the display panel 100 and the magnetic force generating member 300. Components that are the same as those of FIGS. 1 to 3C will be represented by the same reference numerals, and detailed descriptions thereof may not be provided.

As illustrated in FIG. 4, the display panel 100 includes a base layer BL, an element layer EL, and a magnetic layer ML. The base layer BL may be formed of various suitable flexible materials. For example, the base layer BL may include a plastic material, a glass fiber, and/or silicon-based rubber containing polymer resin. The materials of the base layer BL are exemplarily described, and the base layer BL may be formed of various suitable materials that have flexibility and durability and will not be limited to any one embodiment.

The element layer EL is disposed on one side of the base layer BL. The element layer EL may include a plurality of thin films. For example, the element layer EL may include a pixel layer PXL and a touch layer TCL. The pixel layer PXL includes a plurality of pixels.

Pixels may receive an electrical signal to generate an image corresponding to the electrical signal. The pixels are disposed to be spaced apart from each other on a plane. For example, although the pixels are arranged in a matrix form, the arrangement of the pixels are exemplarily described and will not be limited to any one embodiment.

Each of the pixels may include at least one thin film transistor and display element. The thin film transistor is connected to the display element to turn on or off the display element. The display element may realize or generate the image according to the electrical signal.

The display element may vary according to the kind of display panel. For example, the display element may include a liquid crystal capacitor, an organic light emitting element, an electrophoretic element, an electrowetting element, and/or the like.

The touch layer TCL is disposed on the pixel layer PXL. The touch layer TCL may detect an external touch to generate a touch signal corresponding to the external touch. The touch signal has information about a point of the display panel 100, which is touched.

The touch layer TCL may be disposed between the pixel layer PXL and the base layer BL. The display panel 100 according to the present inventive concept may include various embodiments and may not be limited to any one embodiment.

At least one insulation film may be further disposed between the pixel layer and the touch layer TCL. Also, the touch layer TCL may be disposed between the pixel layer PXL and the base layer BL. The display panel 100 according to the present inventive concept may include various embodiments and may not be limited to any one embodiment.

The magnetic layer ML is disposed on the other side of the base layer BL. The magnetic layer ML may include a polarity layer MGL and an insulation layer INL. The polarity layer MGL may have one polarity of polarities generating the magnetic force.

The display panel 100 according to the present inventive concept may further include the magnetic layer and thus be supported by the magnetic force generating member 300. The polarity of the polarity layer MGL or the magnetic force generating member 300 may be controlled so that the repulsive force is applied between the polarity generated from the polarity layer MGL and the polarity generated from the magnetic force generating member 300.

The polarity generated from the polarity layer MGL may be controlled in the same manner as that of the magnetic force generating member 300 so that the repulsive force is applied to the polarity layer MLG and the magnetic force generating member 300. In further detail, the polarity layer MGL may have the same polarity as that defined on an upper portion of the magnetic force generating member 300, that is, a portion facing the polarity layer MGL.

The insulation layer INL is disposed between the polarity layer MGL and the base layer BL. The insulation layer INL insulates the polarity layer MGL from other components. The display panel 100 may further include the insulation layer INL to prevent the polarity layer MGL from magnetically affecting the element layer EL. The insulation layer INL is exemplarily illustrated, and if the base layer BL has a sufficient insulation function, the insulation layer INL may be omitted.

The magnetic layer ML is disposed to overlap at least the first area 110. Thus, the magnetic layer ML may be formed of a flexible material to correspond to the modification of the first area 110. For example, the magnetic layer ML may include a magnetic polymer such as magnetic rubber, and/or the like.

In the current embodiment, the magnetic layer ML having a shape corresponding to the first area 110 is described. The shape of the magnetic layer ML is exemplarily illustrated, and the magnetic layer ML according to an embodiment of the present inventive concept may have a shape overlapping all of the first, second, and third areas 110, 120, and 130 and may not be limited to any one embodiment.

When the display device DS is unfolded, and current is applied to the magnetic force generating member 300, the magnetic force generating member 300 may have characteristics like a magnet and generate a magnetic force. Thus, as illustrated in FIG. 5, the magnetic force generating member 300 may be divided into a plurality of portions as the magnetic force generating member 300 generates the magnetic force.

For example, the magnetic force generating member 300 may be divided into a first portion 300a adjacent to the display panel 100 and a second portion 300b facing the first portion 300a. The first portion 300a may have polarity opposite to that of the second portion 300b.

Here, the first portion 300a may have the same polarity as that of the display panel 100. For example, when the display panel has an N pole NP, the first portion 300a, which is adjacent to the display panel 100, of the magnetic force generating member 300 may have the N pole NP, and the second portion 300b that is far away from the display panel 100 may have an S pole SP.

When the first portion 300a has the same polarity as that defined in the display panel 100, a repulsive force may be generated between the magnetic force generating member 300 and the display panel 100. The display panel 100 may be supported on the magnetic force generating member 300 by the repulsive force.

When the magnetic force is not generated between the display panel 100 and the magnetic force generating member 300, a general display panel 100-F may be bent (e.g., easily bent) in a unfolded state. This is because there is no separate support member for supporting the display panel 100-F by contacting the display panel 100-F.

When the magnetic force generating member 300 is controlled so that a portion, which faces the display panel 100, of the magnetic force generating member 300 has the N pole NP having a polarity that is the same as that of the magnetic layer MGL, the repulsive force is applied between the display panel 100 and the magnetic force generating member 300 each of which has the N pole NP. Thus, the display panel 100 may be spaced apart from the magnetic force generating member 300 and thus be stably supported in the air. The magnetic force generating member 300 may define a flat display surface on the display panel 100 without contacting the display panel 100.

Figure 6:
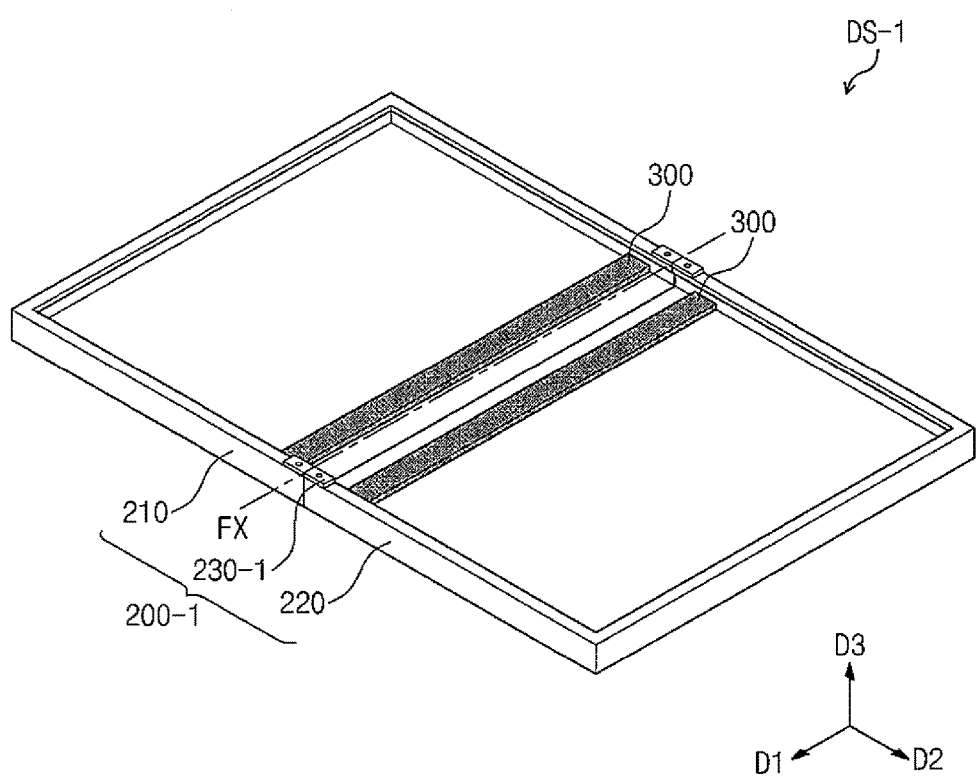
FIG. 6 is a perspective view illustrating a display device according to an embodiment of the present inventive concept.
Figure 7A:
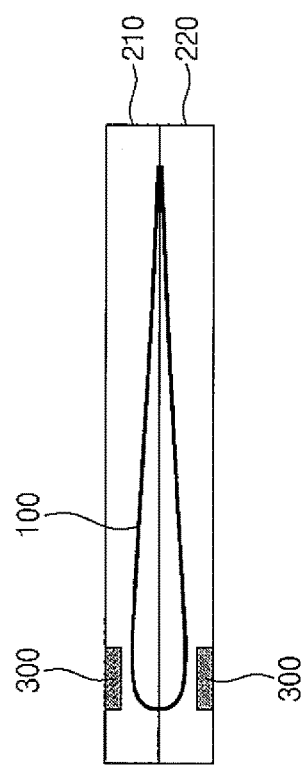
FIGS. 7A and 7B are side views illustrating the display device of FIG. 5.
Figure 7B:
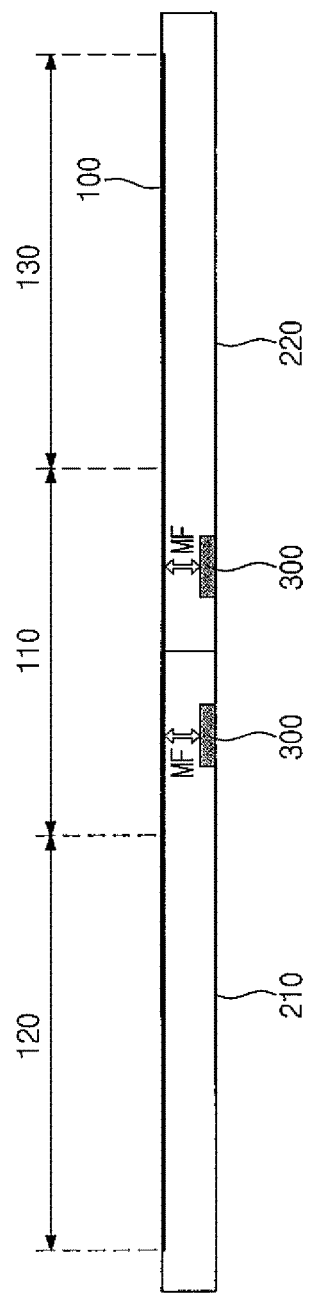

FIG. 6 is a perspective view illustrating a display device according to an embodiment of the present inventive concept. FIGS. 7A and 7B are side views illustrating the display device of FIG. 5.

In FIG. 6, for convenience of illustration, the display panel 100 is omitted. FIGS. 7A and 7B illustrate change of an accommodation member 200-1 and the display panel 100 according to an operation of a display device DS-1.

As illustrated in FIG. 6, a connection part 230-1 may be coupled to on an upper portion of each of a first body part 210-1 and a second body part 220-1. For example, the connection part 230-1 may be a hinge. Here, each of the first body part 210-1 and the second body part 220-1 is fixedly coupled to the connection part 230-1.

Thus, first and second body parts 210-1 and 220-1 may operate in a similar manner as the connection part 230-1. The accommodation member 200-1 is exemplarily illustrated, and the accommodation member according to an embodiment of the present inventive concept may have various suitable shapes and may not be limited to any one embodiment if the accommodation member is foldable or unfoldable.

The magnetic force generating member 300 may be provided in plurality. The plurality of magnetic force generating members 300 may be coupled to the first body part 210-1 and the second body part 220-1, respectively.

Each of the magnetic force generating members 300 may be disposed on an area overlapping the first area (see reference numeral 110 of FIG. 1) of the first body part 210-1 and an area overlapping the first area 110 of the second body part 220-1. Thus, each of the magnetic force generating members 300 may support the first area 110 of the display panel 100.

Here, the magnetic force generating members 300 may be turned off in a state in which the display device DS-1 is folded. Thus, there is no interaction between the magnetic force generating members 300 and the display panel 100 in the state in which the display device DS-1 is folded.

Thus, a distance between the magnetic force generating members 300 and the display panel 100 is not limited. For example, the magnetic force generating members 300 may contact the display panel 100. Thus, a distance between the magnetic force generating members 300 and the display panel 100, which is measured in a state in which the display device DS-1 is folded, may be more than zero.

On the other hand, the magnetic force generating members 300 may be turned on in a state in which the display device DS-1 is unfolded. Thus, each of the magnetic force generating members 300 may be magnetized. Thus, a magnetic force may be generated between the magnetic forge generating members 300 and the magnetic layer (see reference symbol ML of FIG. 4) of the display panel 100. The display panel 100 is supported on the magnetic force generating members 300 by the magnetic force MF.

The minimum distance between the magnetic force generating members 300 and the display panel 100 in the state in which the display device DS-1 is unfolded may be greater than that between magnetic force generating members 300-1 and the display panel 100, which is measured in the state in which the display device DS-1 is folded.

When the display device DS-1 is unfolded, because a current is applied to the magnetic force generating members 300 to magnetize the magnetic force generating members 300, a repulsive force is applied between the display panel 100 and the magnetic force generating members 300. Thus, the display panel 100 is far away from the magnetic force generating members 300.

The minimum distance between the magnetic force generating members 300-1 and the display panel 100, which is measured in the state in which the display device DS-1 is unfolded may gradually increase as the magnetic force applied between the magnetic force generating members 300-1 and the display panel 100 increases in intensity.

The display device DS-1 according to the present inventive concept may adjust intensity of the magnetism of the magnetic force generating members 300 or an amount of the current applied to the magnetic force generating members 300 to control the minimum distance between the magnetic force generating members 300 and the display panel 100, which is measured in the state in which the display device DS-1 is unfolded.

Thus, the display panel 100 may substantially provide a flat display surface to the user in the unfolded state. Also, because the display device DS-1 includes the plurality of magnetic force generating members 300, the display device DS-1 may easily support the display panel 100 regardless of the area of the display panel 100.

Figure 8A:
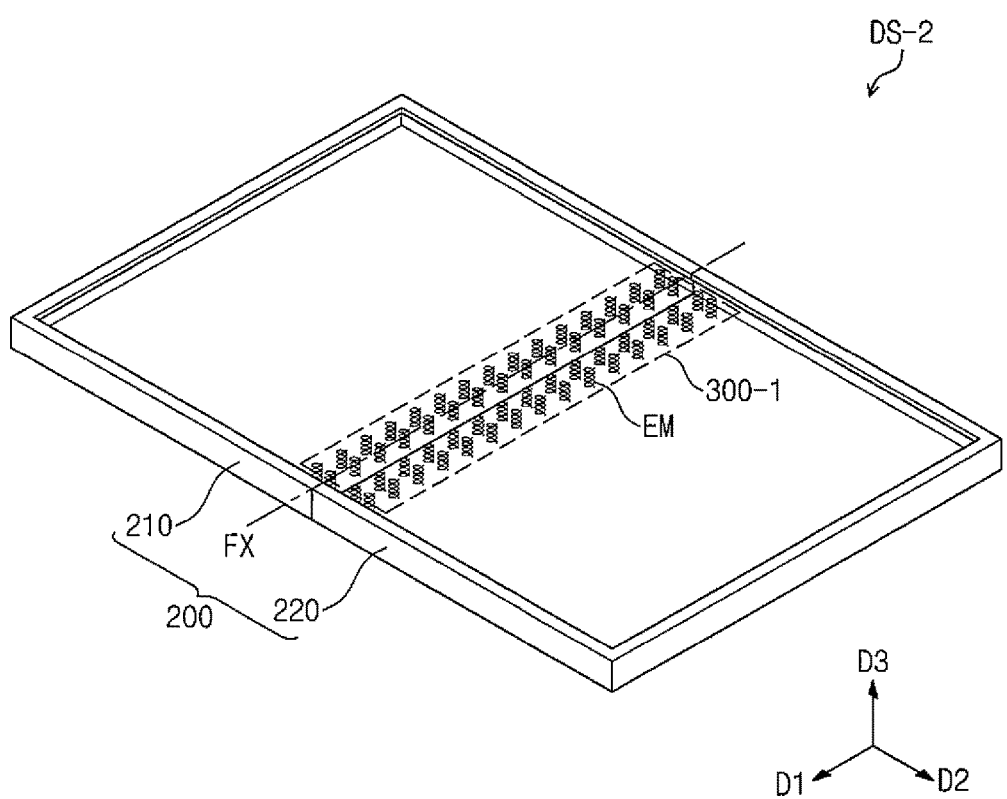
FIG. 8A is a perspective view of a display device according to an embodiment of the present inventive concept.
Figure 8B:
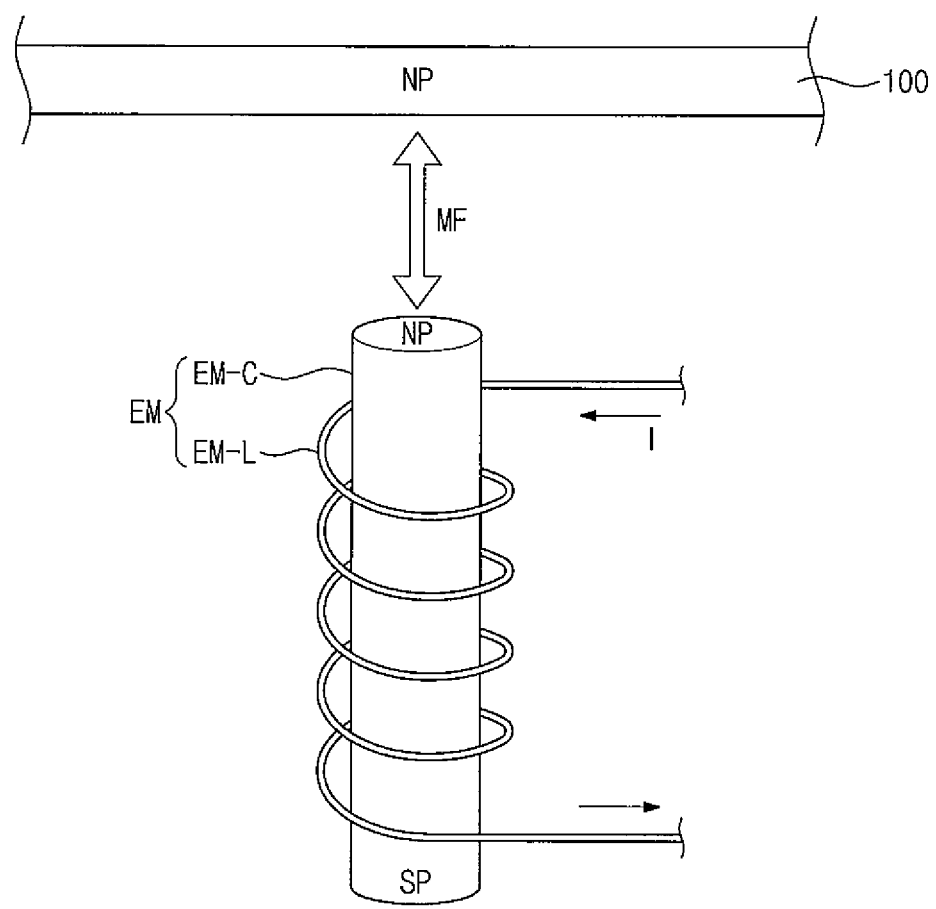
FIG. 8B is a view of a portion of a magnetic force generating member of FIG. 8A.

FIG. 8A is a perspective view of a display device according to an embodiment of the present inventive concept. FIG. 8B is a view illustrating a portion of a magnetic force generating member of FIG. 8A. Hereinafter, a display device DS-2 according to an embodiment of the present inventive concept will be described with reference to FIGS. 8A and 8B.

For convenience of description, the display panel (see reference numeral 100 of FIG. 1) and the connection member 230-1 of FIG. 6 are omitted in FIG. 8A. Because the display device DS-2 includes the accommodation member 200-1 having the same structure as that of the accommodation member 200-1, descriptions of the accommodation member 200-1 may not be provided.

As illustrated in FIGS. 8A and 8B, a magnetic force generating member 300-2 includes a plurality of electromagnets EM. Each of electromagnets EM may be provided in various suitable shapes. For example, the electromagnet EM may be formed of a superconductive material or be provided with a solenoid structure. In the current embodiment, the electromagnet EM may include a core part EM-C and a wire part EM-L.

The wire part EM-L has a shape surrounding the core part EM-C. The wire part EM-L is wound around an outer surface of the core part EM-C. As the current is applied to the wire part EM-L, the core part EM-C becomes a magnetic material exhibiting magnetism.

The core part EM-C may have conductivity and a cylindrical shape. The core part EM-C may be formed of a ferromagnetic material. For example, the core part EM-C may contain iron Fe. The shape of the core part EM-C is not limited thereto, and the core part EM-C may have various suitable column shapes.

In further detail, as the current is applied to the wire part EM-L, the core part EM-C may be polarized so that one side adjacent to the display panel 100 of the core part EM-C has a polarity different from that of the other side far away from the display panel 100. Because the magnetic force generating member 300-1 according to the present inventive concept includes the core part EM-C, the magnetic force generating member 300-1 may generate a relatively strong magnetic force with respect to the current having the same intensity. The core part EM-C may be omitted in the magnetic force generating member 300-1 according to an embodiment of the present inventive concept.

The magnetic force generated from the electromagnet EM varies in direction according to a direction of the current flowing through the wire part EM-L. In the current embodiment, current I provided from the outside may flow in an arrow direction of FIG. 7B.

The direction of the magnetic force generated from the electromagnet EM follows Ampere's Law. As the current is applied in the arrow direction, the magnetic force may be generated toward the display panel 100.

According to the direction of the generated magnetic force, an N pole NP is defined in one side, which faces the display panel 100, of the core part EM-C, and an S pole SP is defined in the other side, which is far away from the display panel 100, of the core part EM-C. In the current embodiment, because the display panel has the N pole NP, a repulsive force may be applied between the magnetic force generating member 300-1 and the display panel 100. Thus, the display panel 100 may be stably supported without contacting the magnetic force generating member 300-1.

Generally, the intensity of the magnetic force generated from the electromagnet EM is proportional to the number of times the wire part EM-L is wound around the core part EM-C and the intensity of the current. That is, the electromagnet EM may generate a relatively large magnetic force as the intensity of the current applied to the wire part EM-L, and as the number of times the wire part EL-L is wound around the core part EM-C.

The display device DS-2 according to the present inventive concept may adjust the intensity of the current I and the number of times the wire part EM-L is wound around the core part EM-C to control the intensity of the magnetic force MF generated from the magnetic force generating member 300-1 and freely control intensity of a support force for supporting the display panel 100. Also, the display device DS-2 may adjust the direction of the current I to stably provide the repulsive force for supporting the display panel 100 regardless of the polarity of the magnetic layer ML of the display panel 100.

Figure 9A:
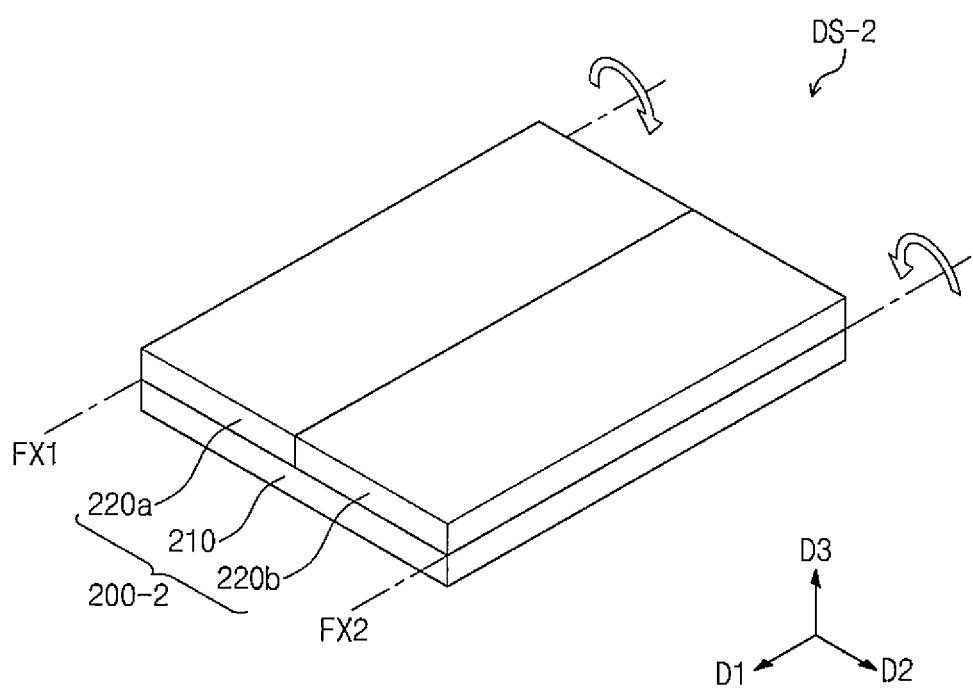
FIG. 9A is a first perspective view of a display device according to an embodiment of the present inventive concept.
Figure 9B:
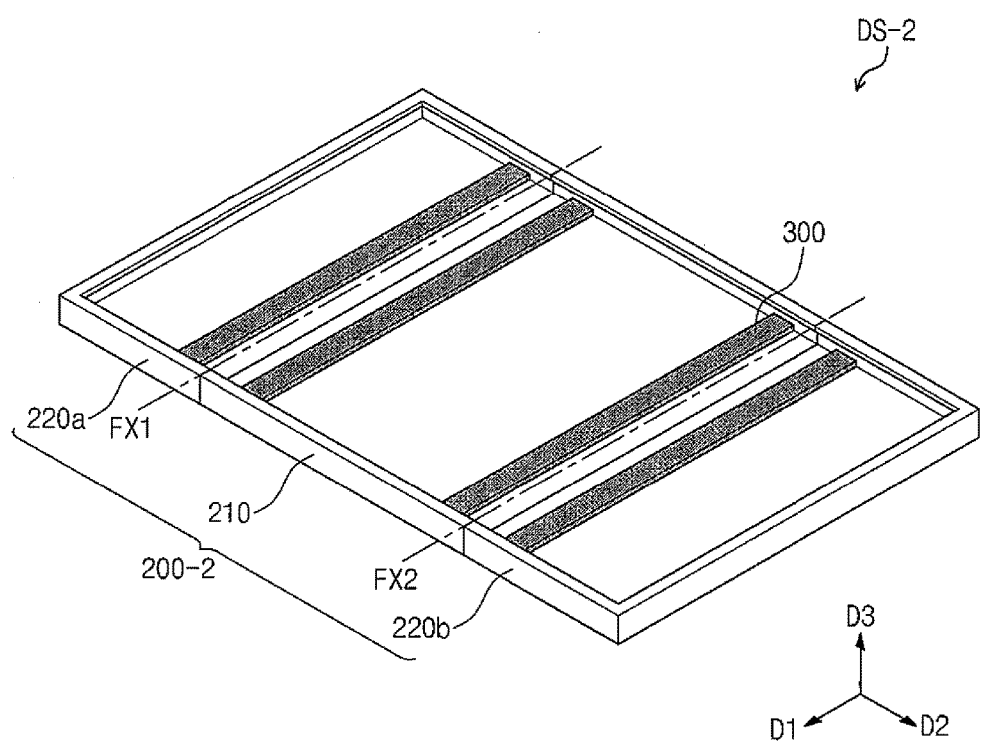
FIG. 9B is a second perspective view of the display device of FIG. 9A.

FIG. 9A is a first perspective view of a display device according to an embodiment of the present inventive concept, and FIG. 9B is a second perspective view of the display device of FIG. 9A. The first perspective view illustrates a state in which the display device DS-2 is folded, and the second perspective view illustrates a state in which the display device DS-2 is unfolded.

For convenience of description, the display panel is omitted in FIGS. 9A and 9B.

As illustrated in FIGS. 9A and 9B, an accommodation member 200-2 of the display device DS-2 may include a first body part 210, a second body part 220a disposed on both ends of the first body part 210, and a third body part 220b.

The second body part 220a is disposed to be spaced apart from the third body part 220b with the first body part 210 therebetween along the second direction D2. In the state in which the display device DS-2 is folded, the second and third body parts 220a and 220b are disposed on the first body part 210. Also, in the state in which the display device DS-2 is unfolded, the second and third body parts 220a and 220b and the first body part 210 are disposed in parallel on the same plane.

Two folding axes FX1 and FX2 are defined in the display device DS-2. The folding axes FX1 and FX2 include a first folding axis FX1 defined between the second body part 220a and the first body part 210 and a second folding axis FX2 defined between the third body part 220b and the first body part 210.

The folding axes FX1 and FX2 may correspond to hinge axes included in the accommodation member 200-2. The second and third body parts 220a and 220b may be folded or unfolded with respect to the hinge axes. The display panel may be folded along the folding axes.

As illustrated in FIG. 9B, the magnetic force generating member 300-1 may be disposed adjacent to the folding axes FX1 and FX2. Here, the magnetic force generating member 300-1 may be provided in plurality, and the plurality of magnetic force generating members 300-1 may be disposed on the first to third body parts 210, 220a, and 220b.

The magnetic force generating member according to an embodiment of the present inventive concept may be disposed on various areas even though the plurality of folding axes are defined. Because the magnetic force generating member is disposed in the accommodation member and has relatively little effect on the display panel, the magnetic force generating member may be applied to the display device that is foldable or unfoldable in various shapes and methods.

Because the display device according to the present inventive concept applies the current to the display panel to support the display panel only in the unfolded state, an effect of the magnetic force generating member in the display panel in the state in which the display device is folded may be removed. Also, because the display device further includes the magnetic force generating member, and additional consumption power needed in the display device is not relatively high, the reliability of the display device may be improved (e.g., increased) with relatively little additional electric power.

According to the present inventive concept, the display panel includes the display panel, the accommodation member in which the display panel is accommodated and folds or unfolds the display panel with respect to one direction, and the magnetic force generating member coupled to the accommodation member and magnetized when the current flows.

The magnetic force generating member may not operate in the state in which the display panel is folded, and may generate the magnetic force in the state in which the display panel is unfolded. The display panel may be supported by the magnetic force generating member through the generated magnetic force.

Because the display device according to the present inventive concept supports the display panel by using the magnetic force, the display device may stably support the display panel without contacting the display panel. Also, because the display device supports the display panel only in the state in the unfolded state, there is no interaction between the magnetic force generating member and the display panel in the state in which the display panel is folded. Thus, the display panel may be stably accommodated into the accommodation member in the folded state. Thus, the reliability of the foldable display device may be improved (e.g., increased).

It will be understood that, although the terms "first", "second", "third", etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section discussed below could be termed a second element, component, region, layer or section, without departing from the spirit and scope of the inventive concept.

The terminology used herein is for the purpose of describing particular embodiments and is not intended to be limiting of the inventive concept. As used herein, the singular forms "a" and "an" are intended to include the plural forms as well, unless the context clearly indicates otherwise. It will be further understood that the terms "include," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of,"

when preceding a list of elements, modify the entire list of elements and do not modify the individual elements of the list. Further, the use of "may" when describing embodiments of the inventive concept refers to "one or more embodiments of the inventive concept." Also, the term "exemplary" is intended to refer to an example or illustration.

It will be understood that when an element or layer is referred to as being "on", "connected to", "coupled to", or "adjacent to" another element or layer, it can be directly on, connected to, coupled to, or adjacent to the other element or layer, or one or more intervening elements or layers may be present. When an element or layer is referred to as being "directly on," "directly connected to", "directly coupled to", or "immediately adjacent to" another element or layer, there are no intervening elements or layers present.

As used herein, the term "substantially," "about," and similar terms are used as terms of approximation and not as terms of degree, and are intended to account for the inherent variations in measured or calculated values that would be recognized by those of ordinary skill in the art.

As used herein, the terms "use," "using," and "used" may be considered synonymous with the terms "utilize," "utilizing," and "utilized," respectively.

It will be apparent to those skilled in the art that various suitable modifications and variations can be made in the present disclosure. Thus, it is intended that the present disclosure covers the modifications and variations of this invention provided they fall within the scope of the appended claims and their equivalents.

Thus, the invention should not be construed as being limited to the embodiments set forth herein and should be only defined by scopes of claims, and equivalents thereof.

What is claimed is:

1. A display device comprising:
   a display panel;
   an accommodation member configured to accommodate the display panel therein and to fold or unfolded the display panel along one direction; and
   a magnetic force generating member coupled to the accommodation member, the magnetic force generating member being configured to be magnetized when current flows, and to generate a magnetic force in a first state in which the display panel is unfolded,
   wherein at least one portion of the display panel is supported by the magnetic force.

2. The display device of claim 1, wherein the magnetic force is a repulsive force that pushes the display panel out.

3. The display device of claim 1,
   wherein the display panel is divided into a first area overlapping a folding axis and a second area and a third area spaced from each other with the first area therebetween in the first state,
   wherein the first area is configured to change in shape in a second state in which the display panel is folded, and
   wherein the first area is defined, on the same plane as those of the second and third areas, by the magnetic force in the first state.

4. The display device of claim 3, wherein the display panel is substantially flat in the first state along a direction crossing a direction in which the folding axis extends.

5. The display device of claim 3, wherein the magnetic force generating member overlaps at least the first area.

6. The display device of claim 5, wherein, when the display panel is unfolded, the current is applied to the magnetic force generating member, and when the display panel is folded, the current is cut off.

7. The display device of claim 6, wherein the magnetic force generating member comprises at least one electromagnet.

8. The display device of claim 3, wherein the display panel comprises:
   a base layer;
   a pixel layer on a front surface of the base layer, the pixel layer being configured to generate an image; and
   a magnetic layer disposed on a rear surface of the base layer, the magnetic layer exhibiting magnetism,
   wherein the magnetic layer overlaps at least the first area of the first to third areas.

9. The display device of claim 8, wherein the magnetic layer comprises a magnetic rubber.

10. The display device of claim 8,
    wherein the magnetic force generating member is divided into a first portion adjacent to the display panel and a second portion connecting to the first portion and farther from the display panel relative to the first portion, the first portion having a different polarity from the second portion, and
    wherein the magnetic layer has the same polarity as the first portion.

11. The display device of claim 3, wherein the accommodation member comprises:
    a first body part overlapping the second area;
    a second body part overlapping the third area; and
    a connection part overlapping the first area, and coupled to the first and second body parts.

12. The display device of claim 11, wherein the magnetic force generating member is coupled to the connection part.

13. The display device of claim 11,
    wherein the magnetic force generating member comprises a plurality of magnetic force generating members, and
    wherein the plurality of magnetic force generating members are on an area overlapping the first area and corresponding to the first body part, and on an area overlapping the first area and corresponding to the second body part.

14. The display device of claim 3, wherein a minimum distance between the display panel and the magnetic force generating member in the first state is greater than that between the display panel and the magnetic force generating member in the second state.

15. The display device of claim 1, wherein the magnetic force generating member is apart from the portion of the display panel in the first state.

16. A display device comprising:
    a display panel;
    an accommodation member configured to accommodate the display panel therein and to fold or unfold the display panel along one direction; and
    a magnetic force generating member coupled to the accommodation member, the magnetic force generating member being magnetized when current flows, and
    wherein the display panel is unfolded in a first state and is folded in a second state,
    wherein the magnetic force generating member generates a magnetic force in the first state, and
    wherein the magnetic force generating member is apart from the display panel in the first state.

* * * * *